United States Patent
Tucker (10) Patent No.: US 7,398,984 B2
(45) Date of Patent: Jul. 15, 2008

(54) VEHICLE SUSPENSION SYSTEM INCORPORATING SWIVEL LINK ASSEMBLY

(75) Inventor: Kyle G. Tucker, Mooresville, NC (US)

(73) Assignee: Detroit Speed & Engineering, Inc., Mooresville, NC (US)

( * ) Notice: Subject to any disclaimer, the term of this patent is extended or adjusted under 35 U.S.C. 154(b) by 439 days.

(21) Appl. No.: 11/282,357

(22) Filed: Nov. 18, 2005

(65) Prior Publication Data
US 2007/0114746 A1 May 24, 2007

(51) Int. Cl.
B60G 9/00 (2006.01)

(52) U.S. Cl. .................. 280/124.116; 403/78; 403/164; 403/165

(58) Field of Classification Search .......... 280/124.116, 280/124.106, 124.125, 124.11, 124.111, 280/124.128, 124.153, 124.107; 403/78, 403/164, 165, 150
See application file for complete search history.

(56) References Cited

U.S. PATENT DOCUMENTS

| | | | | |
|---|---|---|---|---|
| 4,165,098 A | | 8/1979 | Wagner | |
| 4,552,481 A | * | 11/1985 | Bluett | 403/165 |
| 4,765,647 A | * | 8/1988 | Kondo et al. | 280/124.128 |
| 5,458,359 A | * | 10/1995 | Brandt | 280/124.111 |
| 6,357,954 B1 | * | 3/2002 | Timoney | 403/78 |
| 6,502,840 B1 | * | 1/2003 | Leyonhjelm et al. | 280/124.111 |
| 6,550,730 B1 | * | 4/2003 | Hong | 248/219.4 |
| 6,863,289 B2 | * | 3/2005 | Buhl et al. | 280/124.111 |
| 2002/0109325 A1 | * | 8/2002 | Purick | 280/124.128 |

OTHER PUBLICATIONS

"History of the Heim Joint—AKA Rod End Bearing"; www.monstertower.com; 1 page; published prior to Nov. 18, 2005.

* cited by examiner

Primary Examiner—Eric Culbreth
Assistant Examiner—Nicole Verley
(74) Attorney, Agent, or Firm—Schwartz Law Firm, P.C.

(57) ABSTRACT

An adjustable suspension member of a vehicle suspension system is adapted for supporting a frame of vehicle. The suspension member interconnects first and second components of the vehicle, and enables movement of the first component relative to the second component when the vehicle is in motion. The suspension member includes an elongated swivel link assembly having first and second opposite ends. The first end is operatively connected to the first component of the vehicle, and the second end is operatively connected to the second component of the vehicle. The link assembly swivels about a longitudinal axis defined by the suspension member. The swivel range is greater than 45 degrees.

25 Claims, 6 Drawing Sheets

VEHICLE SUSPENSION SYSTEM INCORPORATING SWIVEL LINK ASSEMBLY

TECHNICAL FIELD AND BACKGROUND OF THE INVENTION

This invention relates generally to a vehicle suspension system and swivel link assembly. The swivel link assembly is incorporated in one or more elongated members of the suspension system. The suspension members are allowed to fully articulate during suspension travel, thus providing smooth solid motion with no binding, and improved ride and handling.

When a vehicle is in motion, the suspension system is in a dynamic state of balance, continuously compensating and adjusting for changing driving conditions. Today's suspension system is engineered to perform many functions including maintaining correct vehicle ride height, reducing the effect of shock forces, maintaining correct wheel alignment, supporting the vehicle weight, keeping the tires in contact with the road, and control the vehicle's direction of travel. The interconnection and adjustability of various suspension members, such as the upper and lower control arms, is important in effectively performing each of these functions.

Heim joints, or rod end bearings, are commonly used in prior art suspension systems to adjustably interconnect suspension members. The Heim-joint typically comprises a ball swivel and male-threaded shank which connects to a complementary-threaded end of the suspension member. The ball swivel enables simultaneous pivoting and limited swivel adjustment of the suspension member relative to its point of attachment to the vehicle frame or chassis. Swivel adjustment occurs about a longitudinal axis defined by the suspension member. However, due to the construction of the Heim joint, this adjustability is generally limited to a range of 45 degrees or less. The restricted swivel adjustment promotes increased wear at the joint, increased noise, and "binding" of the suspension.

SUMMARY OF INVENTION

Therefore, it is an object of the invention to provide a vehicle suspension system which incorporates a swivel link assembly designed to allow full articulation during suspension travel.

It is another object of the invention to provide a vehicle suspension system which offers smooth solid motion with no binding.

It is another object of the invention to provide a vehicle suspension system which provides improved ride and handling.

It is another object of the invention to provide a vehicle suspension system which is applicable in any motorized or non-motorized, two or more wheeled vehicle.

It is another object of the invention to provide a vehicle suspension system which resists binding.

It is another object of the invention to provide a vehicle suspension system which incorporates long lower control arms for improved pinion angle control.

It is another object of the invention to provide a vehicle suspension system which has improved anti-squat geometry.

It is another object of the invention to provide a vehicle suspension system which includes a long track bar for improved rear axle lateral control during hard cornering.

It is another object of the invention to provide a vehicle suspension system which does not interfere with stock back seat.

It is another object of the invention to provide a vehicle suspension system which utilizes coilover shocks/springs for spring rate tuning and ride height adjustment.

It is another object of the invention to provide a swivel link assembly designed for being incorporated in vehicle suspension system.

It is another object of the invention to provide a swivel link assembly which has a swivel range greater than 45 degrees.

It is another object of the invention to provide a swivel link assembly which has a swivel range greater than 90 degrees.

It is another object of the invention to provide a swivel link assembly which has a swivel range greater than 180 degrees.

It is another object of the invention to provide a swivel link assembly which has a swivel range of 360 degrees.

It is another object of the invention to provide an improved control arm designed for being incorporated in vehicle suspension system.

It is another object of the invention to provide an improved track bar designed for being incorporated in vehicle suspension system.

These and other objects of the present invention are achieved in the preferred embodiments disclosed below by providing an adjustable suspension member of a vehicle suspension system adapted for supporting a frame of vehicle. The suspension member is adapted for interconnecting first and second components of the vehicle, and enabling movement of the first component relative to the second component when the vehicle is in motion. The suspension member comprises an elongated swivel link assembly having first and second opposite ends. The first end is operatively connected to the first component of the vehicle, and the second end is operatively connected to the second component of the vehicle. Means are provided for swiveling the link assembly about a longitudinal axis defined by the suspension member. The "swivel means" may comprise any suitable structure which enables swiveling of one element in the link assembly relative to the other. For example, in one embodiment, the link assembly comprises mating male and female parts which are pivotably attached together. In another embodiment, the link assembly may comprise a flexible, integrally-formed part which is twistable about its longitudinal axis. In either case, the swivel range is greater than 45 degrees.

The term "operatively connected" is defined broadly herein to mean any direct or indirect, fixed or adjustable connection of one part to another for purposes of achieving operability of the two parts in their given environment.

According to another preferred embodiment of the invention, the first end of the link assembly comprises a female T-link having a first elongated tubular portion extending along the longitudinal axis of the suspension member, and a second elongated tubular portion fixedly attached to the first tubular portion and extending perpendicular to the longitudinal axis of the suspension member.

According to another preferred embodiment of the invention, a rubber bushing resides inside the second tubular portion of the T-link.

According to another preferred embodiment of the invention, a protective metal sleeve covers an outer surface of the rubber bushing.

According to another preferred embodiment of the invention, the rubber bushing defines a longitudinal through-bore adapted for receiving a pivot pin, such that the pivot pin pivotably attaches the first end of the link assembly to the first component of the vehicle.

According to another preferred embodiment of the invention, a protective metal sleeve is located at the through-bore between the rubber bushing and the pivot pin.

According to another preferred embodiment of the invention, the link assembly further includes a male link connected to the female T-link and adapted for swivel movement relative to the T-link.

According to another preferred embodiment of the invention, the link assembly has a swivel range greater than 90 degrees.

According to another preferred embodiment of the invention, the link assembly has a swivel range greater than 180 degrees.

According to another preferred embodiment of the invention, the link assembly has a swivel range of 360 degrees.

Preferably, the adjustable suspension member is a control arm adapted for locating the vehicle suspension system relative to the vehicle frame.

According to another preferred embodiment of the invention, the adjustable suspension member is a track bar or anti-sway bar designed for improving rear axle lateral control during vehicle cornering.

In another embodiment, the invention is an improved vehicle suspension system adapted for supporting a frame of vehicle. The suspension system includes an axle, at least one spring operatively connected to the axle and adapted for absorbing kinetic energy transferred to the frame when the vehicle is in motion, and at least one dampening device for dampening the kinetic energy absorbed by the spring. The improvement comprises an adjustable suspension member as described herein. The suspension member interconnects first and second components of the vehicle, and enables movement of the first component relative to the second component when the vehicle is in motion.

The term "spring" is defined broadly herein to include any biasing means, such as coil springs, leaf springs, torsion bars, and the like. The term "dampening device" refers broadly to any structure, such as a shock absorber or strut, capable of dampening the kinetic energy absorbed by the spring. The term "axle" refers broadly to any supporting structure, hollow tubular or solid, extending laterally between opposite sides of the vehicle, and which may directly or indirectly carry the wheels.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
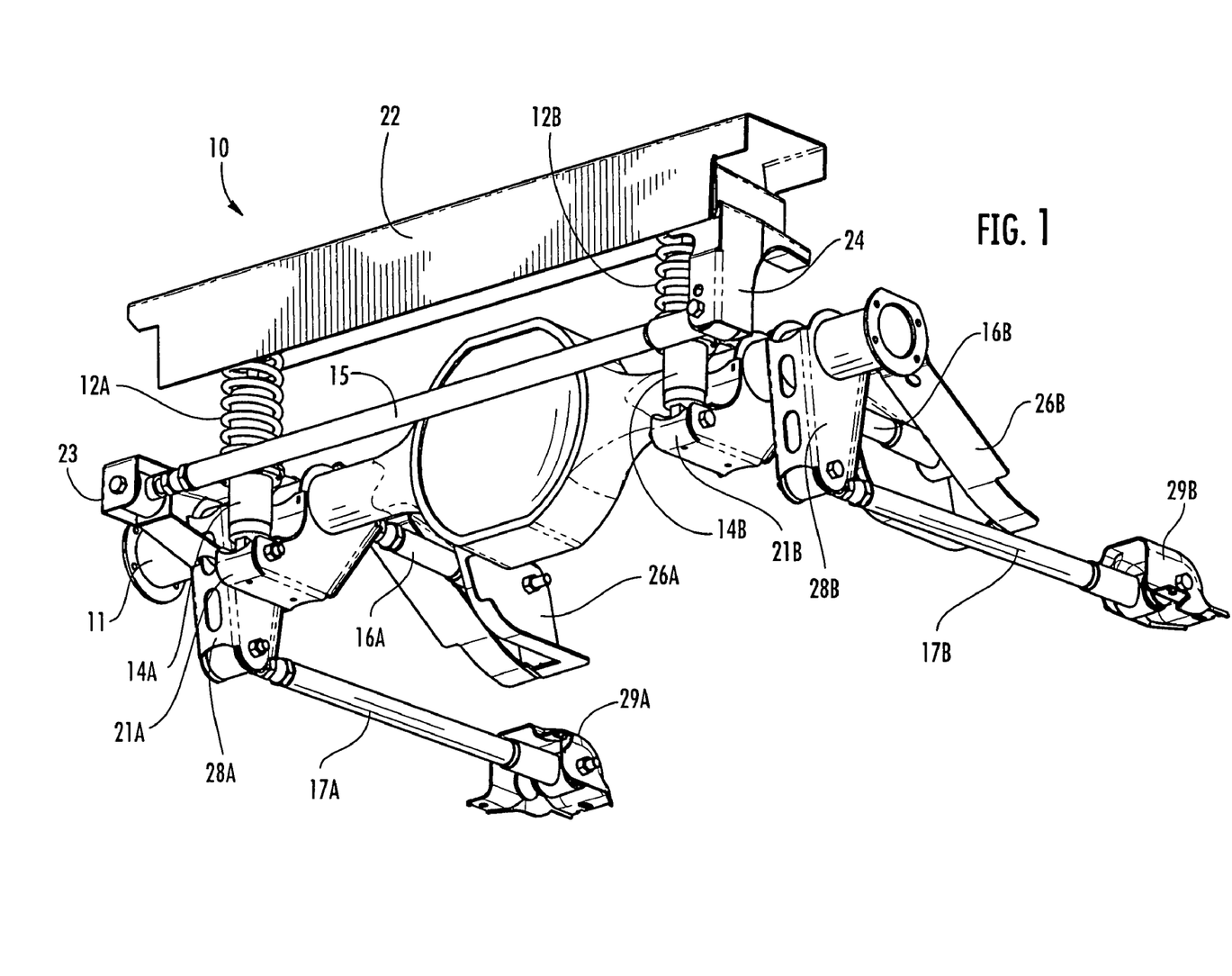
FIG. 1 is a perspective view of a vehicle suspension system according to one preferred embodiment of the present invention.
Figure 2:
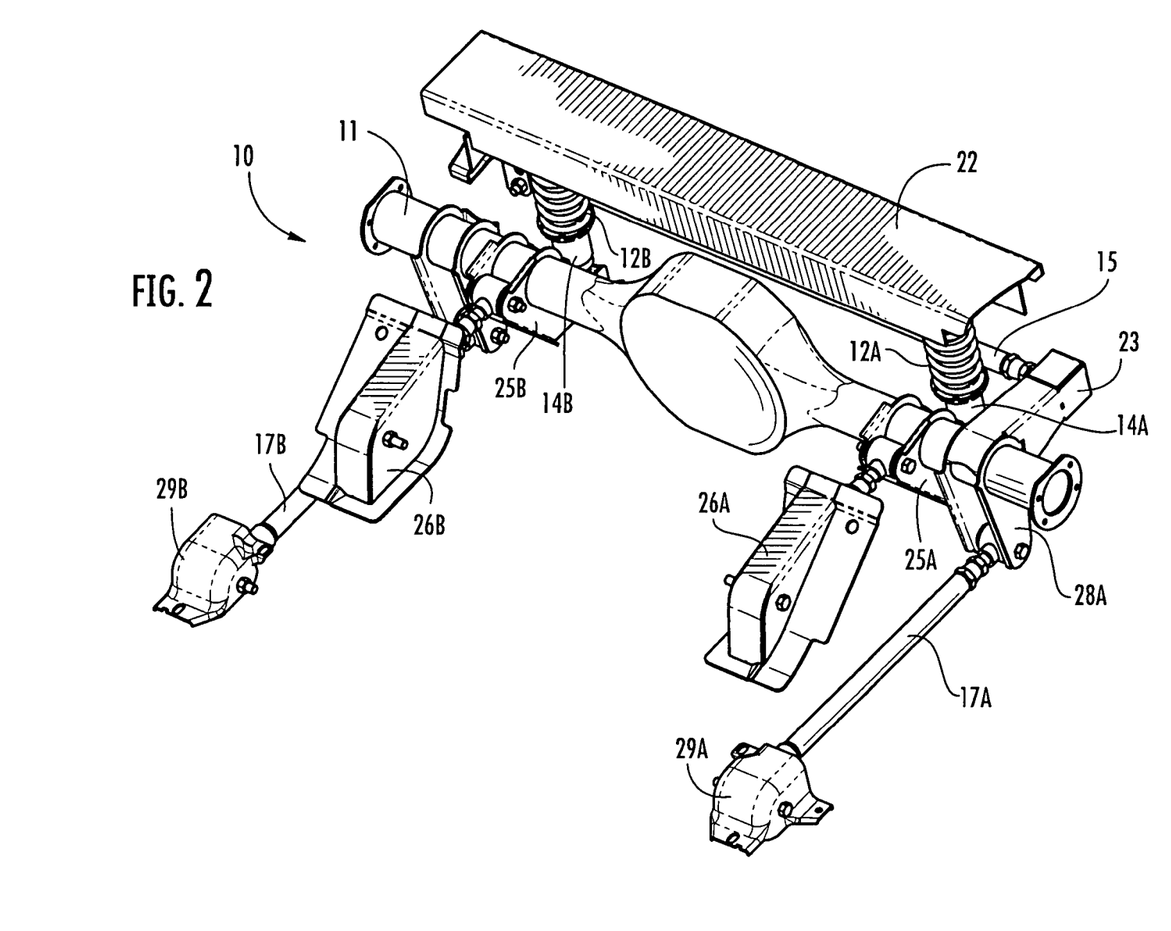
FIG. 2 is a further perspective view of the vehicle suspension system.
Figure 3:
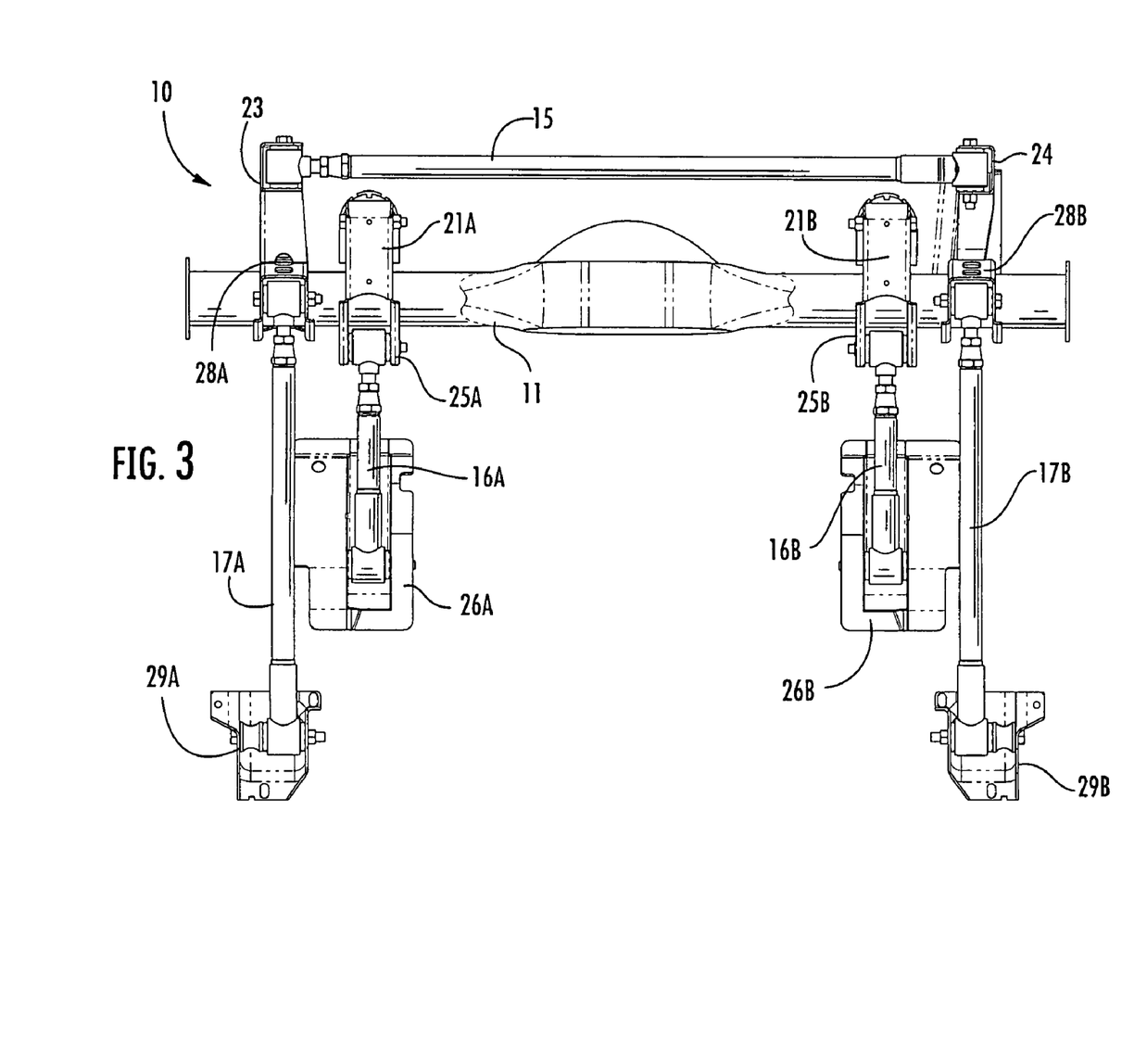
FIG. 3 is an underside view of the vehicle suspension system.
Figure 4:
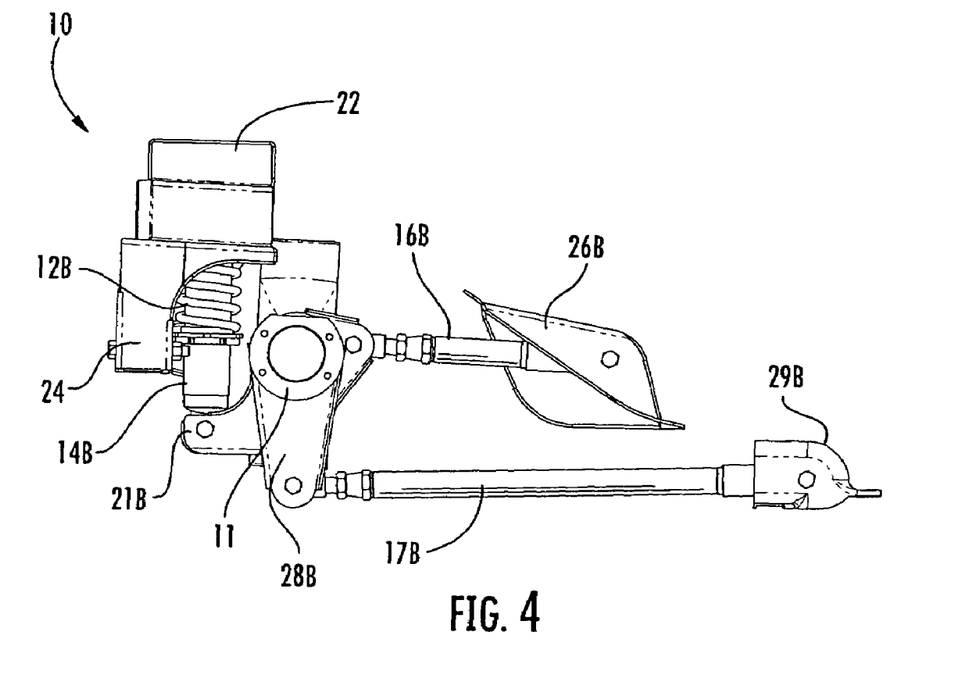
FIG. 4 is a side view of the vehicle suspension system.

Referring now specifically to the drawings, a multi-link vehicle suspension system according to one embodiment of the present invention is illustrated in FIG. 1, and shown generally at reference numeral 10. The suspension system 10 supports the frame of the vehicle, and serves to maintain correct vehicle ride height, reduce the effect of shock forces, maintain correct wheel alignment, keep the tires in contact with the road, and control the vehicle's direction of travel.

As shown in FIGS. 1-4, in one embodiment the suspension system 10 comprises standard components including a wheel axle 11, cooperating pairs of coil springs 12A, 12B and shock absorbers 14A, 14B, a lateral track bar 15, and upper and lower control arms 16A, 16B and 17A, 17B. The coil springs 12A, 12B and shock absorbers 14A, 14B ("coil-over shock absorbers") are attached to respective axle mount brackets 21A, 21B and an upper shock cross-member 22. The coil springs 12A, 12B operate to absorb kinetic energy transferred to the frame when the vehicle is in motion, while the shock absorbers 14A, 14B dampen the energy absorbed by the springs 12A, 12B.

The track bar 15 is attached at one end to an axle mount bracket 23, and at its opposite end to a body mount bracket 24 fixed to the upper shock cross-member 22. The upper control arms 16A, 16B are attached at respective first ends to axle mount brackets 25A, 25B integrally-formed with brackets 21A, 21B, and at respective opposite ends to upper mounting pockets 26A, 26B adapted for attaching to the vehicle frame. The lower control arms 17A, 17B are attached at respective first ends to axle mount brackets 28A, 28B, and at respective opposite ends to lower mounting pockets 29A, 29B adapted for attaching to the vehicle frame. The upper and lower control arms 16A, 16B and 17A, 17B cooperate to locate the suspension system 10 relative to the frame when the vehicle is in motion.

Figure 5:
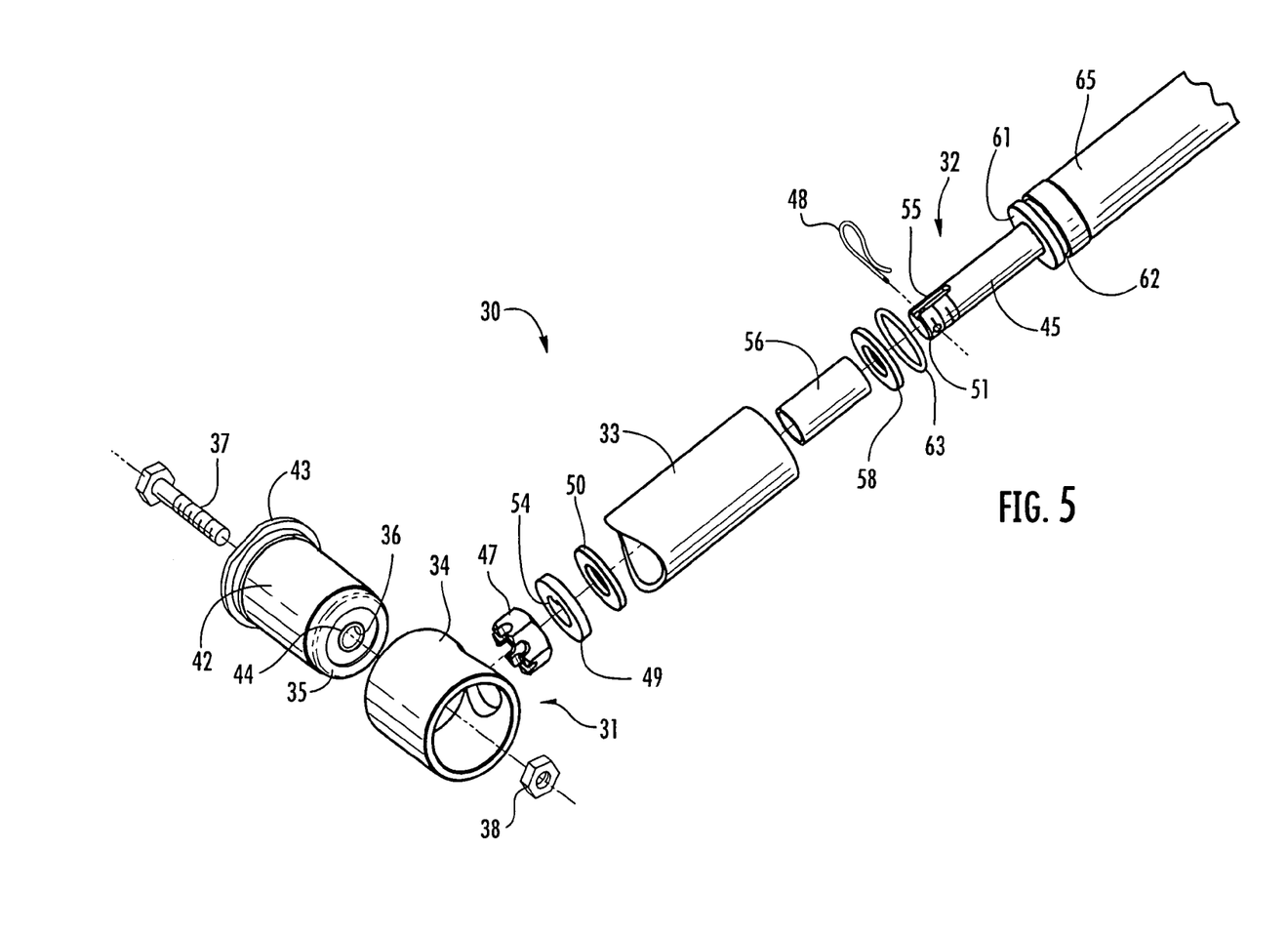
FIG. 5 is an exploded, perspective view of a swivel link assembly according to one preferred embodiment of the present invention.
Figure 6:
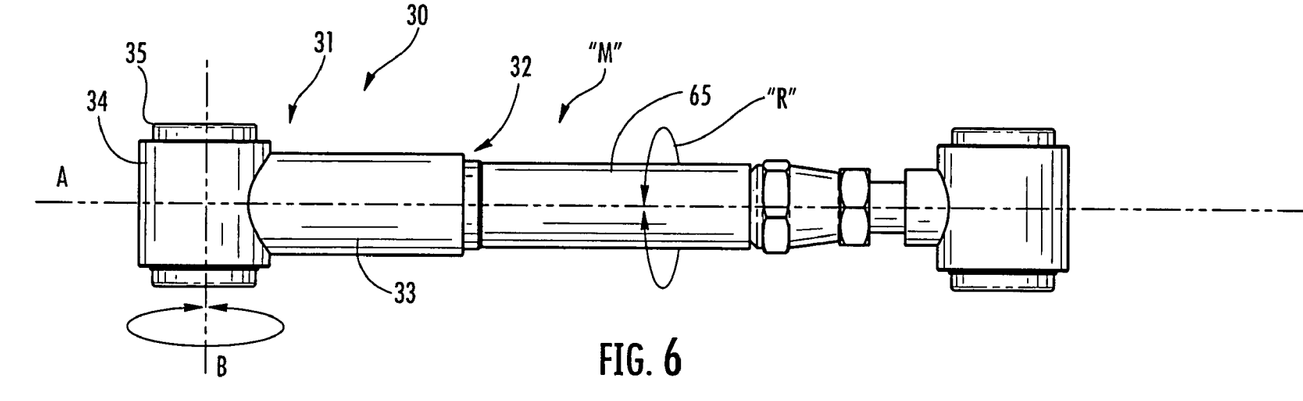
FIG. 6 is a top view of the swivel link assembly.
Figure 7:
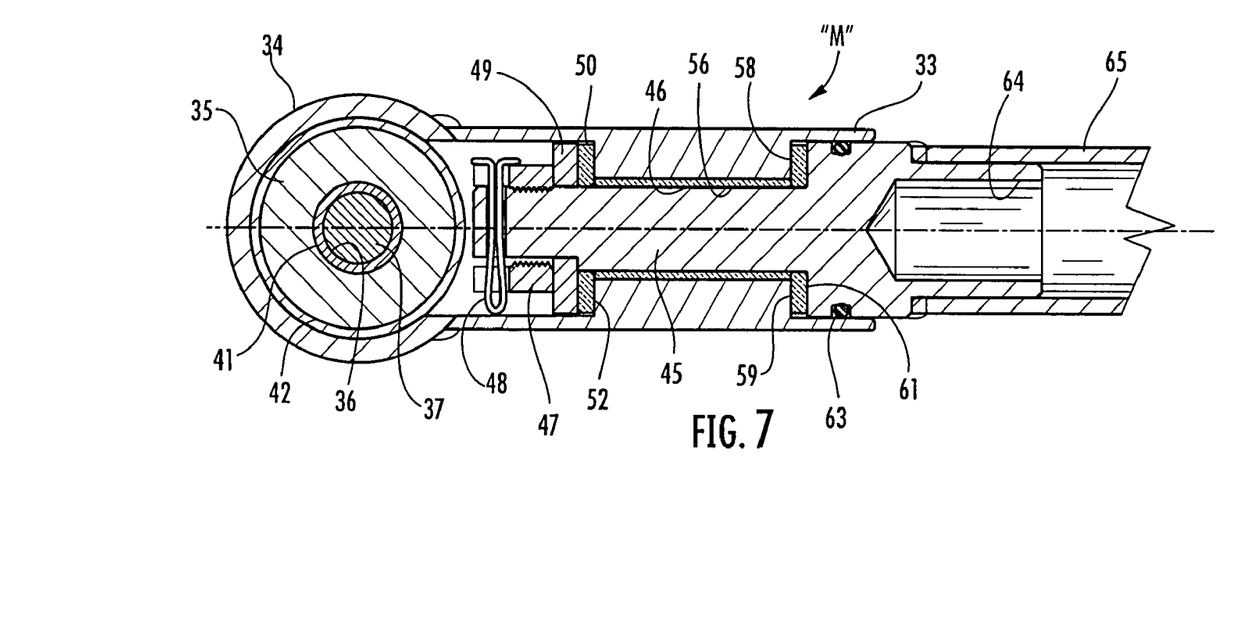
FIG. 7 is a fragmentary cross-sectional view of the swivel link assembly.

Preferably, each of the track bar 15, upper control arms 16A, 16B, lower control arms 17A, 17B comprises an elongated swivel link assembly 30 best illustrated in FIGS. 5, 6, and 7. The track bar 15 and upper and lower control arms 16A, 16B and 17A, 17B are referred to generically below as "suspension members." Suspension members may also include other dynamic links and components not shown or described herein. The swivel link assembly 30 is adapted for swivel adjustment along a longitudinal axis "A" of the suspension member "M", and through a swivel range "R" of at least 45 degrees—a range greater than that afforded by traditional Heim joints commonly used in prior art suspension systems. Preferably, the swivel range "R" is greater than 90 degrees; and more preferably, greater than 180 degrees; and most preferably, 360 degrees. The basic operation and construction of the swivel link assembly 30 described below is applicable in any dynamic suspension member, including each of the track bar 15 and control arms 16A, 16B and 17A, 17B.

Referring to FIGS. 5-7, the swivel link assembly 30 comprises a female T-link 31 designed to receive an elongated proximal end of a mating male link 32. The female T-link 31 has a first elongated tubular portion 33 extending along the longitudinal axis "A" of the suspension member "M", and a second elongated tubular portion 34 fixedly attached to the first tubular portion 33 and extending along a perpendicular axis "B". The first and second tubular portions 33, 34 are preferably joined together by welding or other permanent attachment means.

As best shown in FIGS. 5 and 7, the second tubular portion 34 of the female link 31 has open ends for receiving and holding a natural high-durometer rubber or urethane bushing 35. During suspension travel, the bushing 35 provides a pivot point for the suspension member "M" about axis "B". The bushing 35 also maintains the lateral and vertical location of the suspension member pivot point, maintains dynamic wheel alignment, reduces transmitted noise, road shock, and vibration, and provides resistance to suspension movement. The bushing 35 has a central through-bore 36 for receiving a threaded pivot bolt 37. In one application, the pivot bolt 37 and a complementary nut 38 cooperate to pivotably attach the suspension member "M" to a mounting bracket of the vehicle suspension system. Inside and outside metal sleeves 41 and 42 are preferably located within the through-bore 36 and over the bushing 35, respectively, for reducing friction and for wear protection. A flange plate 43 at one end of the bushing 35 facilitates pivoting adjustment of the suspension member "M" about axis "B".

The first tubular portion 33 of the female T-link 31 has an open distal end designed to receive the mating male link 32 of the swivel link assembly 30. The male link 32 comprises an integral, reduced-diameter threaded end 45 which extends through a corresponding reduced-diameter interior opening 46 of the female tubular portion 33, and cooperates with a complementary threaded nut 47, cotter pin 48, and washers 49 and 50 to hold the links 31, 32 together for relative swiveling adjustment. The cotter pin 48 passes through a small hole 51 formed with the male link 32, and helps lock the nut 47 and washers 49, 50 in position against a first interior shoulder 52 of the female T-link 31. Preferably, the nut-side washer 49 has a key 54 which aligns with a longitudinal keyway 55 formed with the threaded male end 45 to prevent torsional force on the nut 47 during swivel adjustment of the male link 32 relative to the female link 31. A cylindrical metal bushing 56 resides between the male link 32 and an interior wall defining the reduced-diameter opening 46. An additional washer 58 resides adjacent an opposite interior shoulder 59 of the female T-link 31, and engages an intermediate annular shoulder 61 of the male link 32. A circumferential groove 62 is formed with the male link 32 adjacent the annular shoulder 61 for housing a rubber O-ring 63. In one embodiment, the end of the male link 32 opposite threaded end 45 comprises an integrally-formed reduced-diameter connecting stub 64 designed to receive an intermediate link 65. The intermediate link 65 is preferably permanently welded at one end to the male link 32. The opposite end of the intermediate link 65 may be operatively connected to similar or identical male and female links which may attach either directly or indirectly to the vehicle frame, or directly or indirectly to a mounting bracket of the suspension system 10.

During suspension travel, each of the suspension members incorporating the swivel link assembly 30 are designed for simultaneous swivel adjustment about axis "A" and pivoting adjustment about axis "B". The female link 31 pivots about axis "B" but is fixed (non-swivelable along axis "A"), whereas the operatively connected male link 32 swivels about axis "A" relative to the female link 31.

A vehicle suspension system incorporating a swivel link assembly is described above. Various details of the invention may be changed without departing from its scope. Furthermore, the foregoing description of the preferred embodiment of the invention and best mode for practicing the invention are provided for the purpose of illustration only and not for the purpose of limitation—the invention being defined by the claims.

I claim:

1. In a vehicle suspension system adapted for supporting a frame of vehicle, and comprising an axle, at least one spring operatively connected to the axle and adapted for absorbing kinetic energy transferred to the frame when the vehicle is in motion, and at least one dampening device for dampening the kinetic energy absorbed by the spring, the improvement comprising an adjustable suspension member interconnecting first and second components of the vehicle and enabling movement of the first component relative to the second component when the vehicle is in motion, said suspension member comprising:
    an elongated swivel link assembly having first and second opposite ends, the first end being operatively connected to the first component of the vehicle and the second end being operatively connected to the second component of the vehicle;
    means for swiveling said link assembly about a longitudinal axis defined by said suspension member; and
    said link assembly having a swivel range greater than 45 degrees.

2. A vehicle suspension system according to claim 1, wherein the first end of said link assembly comprises a female T-link having a first elongated tubular portion extending along the longitudinal axis of said suspension member, and a second elongated tubular portion fixedly attached to the first tubular portion and extending perpendicular to the longitudinal axis of said suspension member.

3. A vehicle suspension system according to claim 2, and comprising a rubber bushing residing inside the second tubular portion of said T-link.

4. A vehicle suspension system according to claim 3, and comprising a protective metal sleeve covering an outer surface of said rubber bushing.

5. A vehicle suspension system according to claim 3, wherein said rubber bushing defines a longitudinal through-bore adapted for receiving a pivot pin, such that the pivot pin pivotably attaches the first end of said link assembly to the first component of the vehicle.

6. A vehicle suspension system according to claim 5, and comprising a protective metal sleeve located at the through-bore between said rubber bushing and the pivot pin.

7. A vehicle suspension system according to claim 2, wherein said link assembly further comprises a male link connected to said female T-link and adapted for swivel movement relative to said T-link.

8. A vehicle suspension system according to claim 1, wherein said link assembly has a swivel range greater than 90 degrees.

9. A vehicle suspension system according to claim 1, wherein said link assembly has a swivel range greater than 180 degrees.

10. A vehicle suspension system according to claim 1, wherein said link assembly has a swivel range of 360 degrees.

11. In a vehicle suspension system adapted for supporting a frame of vehicle, and comprising an axle, at least one spring operatively connected to the axle and adapted for absorbing kinetic energy transferred to the frame when the vehicle is in motion, and at least one dampening device for dampening the kinetic energy absorbed by the spring, the improvement comprising an adjustable control arm operatively connected to the axle and adapted for locating the suspension system relative to the frame, said control arm comprising:
    an elongated swivel link assembly having first and second opposing ends, the first end being operatively connected to the axle of the suspension system and the second end being operatively connected to the frame;
    means for swiveling said link assembly about a longitudinal axis defined by said control arm, such that said suspension system is movable relative to the frame when the vehicle is in motion; and
    said link assembly having a swivel range greater than 45 degrees.

12. A vehicle suspension system according to claim 11, wherein the first end of said link assembly comprises a female T-link having a first elongated tubular portion extending along the longitudinal axis of said control arm, and a second elongated tubular portion fixedly attached to the first tubular portion and extending perpendicular to the longitudinal axis of said control arm.

13. A vehicle suspension system according to claim 12, and comprising a rubber bushing residing inside the second tubular portion of said T-link.

14. A vehicle suspension system according to claim 13, wherein said rubber bushing defines a longitudinal through-bore adapted for receiving a pivot pin, such that the pivot pin pivotably attaches the first end of said link assembly to the axle of the suspension system.

15. A vehicle suspension system according to claim 12, wherein said link assembly further comprises a male link connected to said female T-link and adapted for swivel movement relative to said T-link.

16. An adjustable suspension member of a vehicle suspension system adapted for supporting a frame of vehicle, said suspension member adapted for interconnecting first and second components of the vehicle and enabling movement of the first component relative to the second component when the vehicle is in motion, said suspension member comprising:
   an elongated swivel link assembly having first and second opposite ends, the first end being operatively connected to the first component of the vehicle and the second end being operatively connected to the second component of the vehicle;
   means for swiveling said link assembly about a longitudinal axis defined by said suspension member; and
   said link assembly having a swivel range greater than 45 degrees.

17. An adjustable suspension member according to claim 16, wherein the first end of said link assembly comprises a female T-link having a first elongated tubular portion extending along the longitudinal axis of said suspension member, and a second elongated tubular portion fixedly attached to the first tubular portion and extending perpendicular to the longitudinal axis of said suspension member.

18. An adjustable suspension member according to claim 17, and comprising a rubber bushing residing inside the second tubular portion of said T-link.

19. An adjustable suspension member according to claim 18, wherein said rubber bushing defines a longitudinal through-bore for receiving a pivot pin, such that the pivot pin is adapted for pivotably attaching the first end of said link assembly to the first component of the vehicle.

20. An adjustable suspension member according to claim 17, wherein said link assembly further comprises a male link connected to said female T-link and adapted for swivel movement relative to said T-link.

21. An adjustable control arm of a vehicle suspension system adapted for supporting a frame of vehicle, the suspension system comprising an axle, at least one spring operatively connected to the axle and adapted for absorbing kinetic energy transferred to the frame when the vehicle is in motion, and at least one dampening device for dampening the kinetic energy absorbed by the spring, said control arm being operatively connected to the axle and adapted for locating the suspension system relative to the frame, said control arm comprising:
   an elongated swivel link assembly having first and second opposing ends, the first end adapted for being operatively connected to the axle of the suspension system and the second end adapted for being operatively connected to the frame;
   means for swiveling said link assembly about a longitudinal axis defined by said control arm, such that said suspension system is movable relative to the frame when the vehicle is in motion; and
   said link assembly having a swivel range greater than 45 degrees.

22. An adjustable control arm according to claim 21, wherein the first end of said link assembly comprises a female T-link having a first elongated tubular portion extending along the longitudinal axis of said control arm, and a second elongated tubular portion fixedly attached to the first tubular portion and extending perpendicular to the longitudinal axis of said control arm.

23. An adjustable control arm according to claim 22, and comprising a rubber bushing residing inside the second tubular portion of said T-link.

24. An adjustable control arm according to claim 23, wherein said rubber bushing defines a longitudinal through-bore for receiving a pivot pin, such that the pivot pin is adapted for pivotably attaching the first end of said link assembly to the axle of the suspension system.

25. An adjustable control arm according to claim 22, wherein said link assembly further comprises a male link connected to said female T-link and adapted for swivel movement relative to said T-link.

* * * * *